United States Patent
Tamaazousti et al.

(10) Patent No.: US 9,613,420 B2
(45) Date of Patent: Apr. 4, 2017

(54) METHOD FOR LOCATING A CAMERA AND FOR 3D RECONSTRUCTION IN A PARTIALLY KNOWN ENVIRONMENT

(75) Inventors: Mohamed Tamaazousti, Dreux (FR); Steve Bourgeois, Choisy le Roy (FR); Michel Dhome, Pont du Chateau (FR); Vincent Gay-Bellile, Paris (FR); Sylvie Naudet, Palaiseau (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 39 days.

(21) Appl. No.: 14/123,087

(22) PCT Filed: May 29, 2012

(86) PCT No.: PCT/EP2012/060044
§ 371 (c)(1),
(2), (4) Date: Nov. 27, 2013

(87) PCT Pub. No.: WO2012/163912
PCT Pub. Date: Dec. 6, 2012

(65) Prior Publication Data
US 2014/0105486 A1    Apr. 17, 2014

(30) Foreign Application Priority Data
May 30, 2011    (FR) ...................... 11 54702

(51) Int. Cl.
*G06K 9/00*    (2006.01)
*G06T 7/00*    (2017.01)

(52) U.S. Cl.
CPC .......... *G06T 7/0044* (2013.01); *G06T 7/0071* (2013.01); *G06T 2207/10016* (2013.01);
(Continued)

(58) Field of Classification Search
None
See application file for complete search history.

(56) References Cited

U.S. PATENT DOCUMENTS

| | | | |
|---|---|---|---|
| 6,793,350 B1 * | 9/2004 | Raskar | G03B 37/04 353/121 |
| 8,160,400 B2 * | 4/2012 | Snavely | G06F 17/30274 382/100 |

(Continued)

FOREIGN PATENT DOCUMENTS

| | | |
|---|---|---|
| JP | 2005-156514 A | 6/2005 |
| JP | 2005-517253 A | 6/2005 |
| JP | 2007-278844 A | 10/2007 |

OTHER PUBLICATIONS

Online camera pose estimation in partially known and dynamic scenes, Bleser et al., IEEE, 1-4244-0651, 2006, pp. 56-65.*

(Continued)

*Primary Examiner* — Jayesh A Patel
(74) *Attorney, Agent, or Firm* — Baker Hostetler LLP

(57) ABSTRACT

A method for locating a camera and 3D reconstruction of its static environment, comprising an object of interest, the 3D model of which is known, includes: calculating an initial pose of the camera in the environment and an initial reconstruction; calculating the pose of the camera for each new image by pairing 3D primitives of the environment with 2D primitives of said image and reconstructing 3D primitives of the environment by triangulation; and simultaneously optimizing the poses of the camera and 3D primitives by minimizing a reprojection error over a plurality of images. The 3D model is a geometric description of the object of interest, the reprojection error has only two types of terms, a first type associated with primitives constrained by the 3D model and a second type associated with primitives of the (Continued)

environment other than the object, the optimization associating the primitives with the environment or 3D model.

10 Claims, 2 Drawing Sheets

(52) U.S. Cl.
CPC .............. *G06T 2207/20004* (2013.01); *G06T 2207/30204* (2013.01); *G06T 2207/30241* (2013.01); *G06T 2207/30252* (2013.01)

(56) References Cited

U.S. PATENT DOCUMENTS

| | | | | |
|---|---|---|---|---|
| 8,698,875 B2* | 4/2014 | Anguelov | ............... | G06T 7/004 348/135 |
| 8,896,665 B2* | 11/2014 | Kim | ............... | G06T 7/0018 348/46 |
| 2001/0043738 A1* | 11/2001 | Sawhney | ............... | G01S 5/163 382/154 |
| 2003/0085992 A1 | 5/2003 | Arpa et al. | | |
| 2003/0206652 A1* | 11/2003 | Nister | ............... | G06T 7/0065 382/154 |
| 2007/0253618 A1* | 11/2007 | Kim | ............... | G06T 7/0018 382/154 |
| 2008/0310757 A1* | 12/2008 | Wolberg | ............... | G06K 9/00208 382/285 |
| 2009/0009513 A1* | 1/2009 | van den Hengel | ... | G06T 7/0071 345/420 |
| 2010/0045701 A1* | 2/2010 | Scott | ............... | G01S 5/163 345/633 |
| 2010/0220173 A1* | 9/2010 | Anguelov | ............... | G06T 7/004 348/36 |
| 2013/0162785 A1* | 6/2013 | Michot | ............... | G06K 9/6289 348/50 |

OTHER PUBLICATIONS

Generic and real-time structure from motion using local bundle adjustment, Mouragnon et al., Elsevier, 2009, pp. 1178-1193.*
Online camera pose estimation in partially known and dynamic scenes, Bleser et al., IEEE, 1-4244-0651,2006, pp. 56-65.*
E. Mouragnon et al., "Generic and Real-Time Structure from Motion Using Local Bungle Adjustment", Image and Vision Computing, Jul. 2009, vol. 27, No. 8, pp. 1178-1193.
V. Lepetit et al., "Monocular Model-Based 3D Tracking of Rigid Objects: A Survey", Foundations and Trends in Computer Graphics and Vision, 2005, vol. 1, No. 1, pp. 1-89.
J. Platonov et al., "A Mobile Markerless AR System for Maintenance and Repair", ISMAR, IEEE, 2006, pp. 105-108.
P. Lothe et al., "Towards Geographical Referencing of Monocular SLAM Reconstruction Using 3D City Models: Application to Real-Time Accurate Vision-Based Localization", CVPR, 2009, pp. 1-8.
G. Gleser et al., "Online Camera Pose Estimation in Partially Known and Dynamic Scenes", ISMAR, IEEE , 2006, pp. 56-65.
V. Gay-Bellile et al., "Augmented Reality in Large Environments: Application to Aided Navigation in Urban Context", ISMAR, 2010, 2 pages.
P. Lothe et al., "Real-Time Vehicle Global Localisation with a Single Camera in Dense Urban Areas: Exploitation of Coarse 3D City Models", CVPR, 2010, 8 pages.
E. Mouragnon et al., "Real Time Localization and 3D Reconstruction", CVPR, 2006, pp. 1-8.
M. Farenzena et al., "Efficient Camera Smoothing in Sequential Structure-From-Motion Using Approximate Cross-Validation", ECCV, 2008, 14 pages.
Search Report dated Jul. 12, 2012 from PCT Application No. PCT/EP2012/060044.
Takayuki Okaya Bundle Adjustment, IPS Japan Research Report, IPS Japan, Aug. 15, 2009, vol. 2009, CVIM-167, No. 37, pp. P1-P16. (Abstract and partial translation).
Office Action in Japanese Patent Application No. 2014-513155, dated Feb. 16, 2016.

* cited by examiner

METHOD FOR LOCATING A CAMERA AND FOR 3D RECONSTRUCTION IN A PARTIALLY KNOWN ENVIRONMENT

CROSS-REFERENCE TO RELATED APPLICAITONS

This application is National Stage of International patent application PCT/EP2012/060044, filed on May 29,2011, which claims priority to foreign French patent application No. FR 1154702, filed May 30, 2011, the disclosures of which are incorporated by reference in their entirety.

FIELD OF THE INVENTION

The field of the invention is the 3D reconstruction of a partially known environment and the localization, by vision, of a camera in this environment in which it is moving; the expression "partially known environment" should be understood to mean an environment which includes an object of interest of which the 3D geometric model is known, the environment outside of the object being unknown.

BACKGROUND

Estimating the trajectory of a camera is notably used in augmented reality applications which merge virtual objects in digital images of a real scene. The main difficulty with augmented reality systems that use a single camera is how to estimate as accurately as possible the 3D registration between the real scene (or real environment) and the 3D virtual information to obtain a realistic merging. This 3D registration entails determining at any instant the pose of the camera, that is to say its position and its orientation in relation to a fixed reference frame on the scene.

The estimation of the pose of a camera relative to a 3D scene is a very active research topic.

Most of the existing methods, notably for tracking 3D objects, consider only a known part of the scene, in this case the 3D-modelled part, of an object of interest. Among these methods, those which are model-based, or "model-based tracking", and those which are based on learning, can be distinguished.

The model-based methods consist in calculating the 6 pose parameters of the camera by minimizing, for each of the images picked up by the camera, the distance between the edges of the projected 3D model and the edges detected in the image. One example of such a method is described by Vincent Lepetit and Pascal Fua in the publication "Monocular model-based 3d tracking of rigid objects: A survey", in FTCGV, 2005. The main limitation of these methods is that they work only if the object is always visible in the sequence of images. To obtain an accurate pose, it is also necessary for the object of interest to take up a good portion of the image, or, to put it another way, to be "close" to the camera. Furthermore, the movements of the camera must be small to be able to ensure the 3D tracking.

The learning-based methods require a preliminary so-called learning phase which consists in learning the photometric aspect (that is to say the appearance) of the object. This phase consists in enriching the 3D model of the object by texture descriptors extracted from the images. Two types of learning are possible:

Coded markers of known positions are placed around the object so as to estimate the pose of the camera for a few points of view. A coded marker (also called coded target) is an optical marker of known size that can easily be detected in the image and identified by its code. For each of these points of view, points of interest are extracted from the image and characterized by the surrounding texture, and then are associated directly with the 3D points that correspond to them on the object by a single projection from the viewpoint of the camera, the latter being known for each of these points of view by virtue of the coded targets. An example is presented by Juri Platonov and Hauke Heibel and Peter Meier and Bert Grollmann in the publication "A mobile markerless AR system for maintenance and repair" in ISMAR, 2006.

A cloud of 3D points is estimated by matching2D points of a video sequence and by using a technique of reconstruction by SfM, the acronym SfM standing for "Structure from Motion". Then, this cloud of 3D points is realigned offline and semi-automatically on the 3D model of the object to obtain 3D points belonging to the model, enriched by descriptors extracted from the images. P. Lothe, S. Bourgeois, F. Dekeyser, E. Royer and M. Dhome can be cited, who describe an example of this method in the publication "Towards geographical referencing of monocular slam reconstruction using 3d city models: Application to real-time accurate vision-based localization", in CVPR, 2009. Once this learning phase has been carried out, the calculation of poses online is performed by associating the 2D points extracted from the current image with the 3D points of the object by using a criterion of likelihood of the descriptors.

The two main limitations of these methods are that, on the one hand, they require a preliminary learning phase and, on the other hand, they are very sensitive to the changes of photometric appearance of the object between the learning phase and the pose calculation phase (worn objects, variations of the lighting conditions). Furthermore, these methods work only on strongly textured objects.

Globally, the main limitation of these methods that consider only the known part of the object is that they work only if the object is always visible in the sequence of images. If the object is totally occulted or if it disappears from the field of view of the camera these methods can no longer calculate the pose of the camera.

These methods are also subject to "jittering" (tremors in augmented reality due to instabilities of the poses calculated from one image to the next) and to obtain an accurate pose estimation, it is necessary for the object of interest to take up a lot of space in the image. In practice, the information concerning the environment is not taken into account in estimating the pose of the camera.

Other methods consider a camera moving in a totally unknown environment. The methods of SfM type or of SLAM "Simultaneous Localization And Mapping" type estimate the movement of a camera without any a priori knowledge of the geometry of the scene observed. Offline then online methods have been proposed. They are very stable because they use the whole of the observed scene to be located. They consist in incrementally estimating the trajectory of the camera and the geometry of the scene. For this, these algorithms make use of the multi-view relationships (a view being an image) to estimate the movement of the camera, possibly with a 3D reconstruction of the scene (in the form of a sparse cloud of 3D primitives: points, straight line segments, etc.). An additional optimization step, which consists in simultaneously refining the poses of the camera and the reconstructed 3D scene, is generally performed. The latter step is called bundle adjustment. The main drawback with the algorithms of SLAM type is that they are subject to accumulations of errors and therefore to a drift in the trajectory over time. Their use in applications which demand great 3D registration accuracy at all times (example: augmented reality) can therefore not be considered in their original form. Also, in the monocular case, the reconstruction is performed on an arbitrary scale; the real scale can be known only by the addition of additional information concerning the metric of the scene; the reconstruction is also performed in an arbitrary reference frame which is not linked to an object of the scene.

Finally, more recently, some methods try to successively combine these two approaches. Methods that use, successively, a model-based approach then SfM techniques have been proposed to estimate the pose of the moving camera in a partially known environment. Bleser et al., in "Online camera pose estimation in partially known and dynamic scenes", in ISMAR, 2006, make use of the geometrical constraints of the model to initialize the reference frame and the scale of the reconstruction of the SLAM algorithm. The location of the camera is then calculated by a "conventional" method of SLAM type which no longer takes account of the 3D model.

The accuracy during initialization is not guaranteed since it is done on a single view, and, in addition, the method remains subject to accumulations of numeric errors and to a drift of the scale factor. As previously specified, the location based on SLAM or SfM type methods does not allow for an accurate location in the medium and long term: problems of drift, etc.

The method described by V. Gay-Bellile, P. Lothe, S. Bourgeois, E. Royer and S. Naudet-Collette in "Augmented Reality in Large Environments: Application to Aided Navigation in Urban Context", in ISMAR, 2010, combines an SLAM technique and a technique of relocation using a prior learning. It therefore makes it possible to calculate the pose of the camera when the object is no longer visible by means of SLAM and avoids the drift by virtue of the relocation. However, this method requires a preliminary learning phase of learning-based method type.

The latter two methods successively use the constraints of the model then those of the environment.

Similarly, a method that successively uses the constraints of the environment then those of the model has been proposed by Lothe et al. in "Real-Time Vehicle Global Localisation with a Single Camera in Dense Urban Areas: Exploitation of Coarse 3D City Models", in CVPR, 2010. In this case, a first reconstruction of the environment is performed, then, in a second stage, a process based on a method of rigid Iterative Closest Point (ICP) type is used to realign the reconstruction on the model. It consists in realigning, when possible (that is to say when the model provides sufficient geometrical constraints), the trajectory of the camera by using only the information of the model. The major drawback with this method is that, in order to conserve the multi-view constraints in the model 3D registration step, they apply a similar transformation to all of the cameras included in the process, which is a big assumption to make in practice. The same drawback as with the model-based methods applies: lack of accuracy and robustness when the object of interest is observed little or not at all. Also, since this method is performed in two successive steps, it is not optimal and does not ensure an accurate real time location at each instant: the correction by virtue of the model is made in an a posteriori step, so the corrected pose for the current image is supplied with a time delay making the method unsuited to applications such as augmented reality.

Consequently, there remains to this day a need for a method for locating the camera and for the 3D reconstruction of the static environment in which the camera is moving, that simultaneously satisfies all the abovementioned requirements, in terms of accuracy, robustness, stability, and does so in real time.

SUMMARY OF THE INVENTION

According to the invention, the location of a camera and the 3D reconstruction of the environment in a partially known environment simultaneously combines, during the phase of optimization of an algorithm of SLAM type, the geometric constraints of the known part of the environment and the multi-view constraints of the known and unknown part of the environment.

The poses of the camera and the reconstructed 3D primitives that make up the environment are calculated by a single cost function with two types of terms, which combines the optimization equations constrained by the geometry of the 3D model for the primitives belonging to the object of interest (=known part of the environment) and the conventional optimization equations for the primitives belonging to the unknown part of the environment.

More specifically, the subject of the invention is a method for locating a camera and for the 3D reconstruction of the static environment in which it is moving and of which the camera forms images, this environment comprising an object of interest of which the 3D model is known, which comprises the following steps:
  a/ calculation of an initial pose of the camera in the environment and of an initial reconstruction,
  b/ calculation of the pose of the camera for each new image by matching3D primitives of the environment with 2D primitives of said image and reconstructing 3D primitives of the environment by triangulation,
  c/ simultaneous optimization of the poses of the camera and of the 3D primitives by minimizing a reprojection error over a plurality of images.

It is mainly characterized in that the 3D model is a geometric description of the object of interest, in that the reprojection error comprises only two types of terms, a first type of terms linked to primitives constrained by the 3D model and a second type of terms linked to primitives of the environment other than the object, and in that the optimization step comprises a substep of associating primitives with the environment or with the 3D model.

Compared to the conventional methods of SLAM or SfM type, this approach enhances the robustness of the refinement and the accuracy of the reconstruction of all the environment as well as the locating of the camera even with a scene (=environment) of large size (numerous 3D primitives and numerous views of the scene). This is due to the fact that our system incorporates absolute information originating from the 3D geometric model. Furthermore, the reconstruction obtained is to real scale (obtained by virtue of the 3D model).

Finally, compared to the model-based tracking methods, the proposed solution is more satisfactory because it does not necessitate seeing the object of interest of the scene continuously. In practice, even if the object concerned is not observed (or if it takes up a small part of the image), the camera can always be located in the environment in which it is moving. The method is then totally robust to the partial and even total occlusions. A better stability of the location of the camera is also obtained.

Finally, compared to the methods which use the two types of information in succession, the two types of constraints are guaranteed to be borne out simultaneously at each instant. A more accurate location of the camera and 3D reconstruction are then obtained, with a more robust method.

The major differences with this method compared to the prior art are that it:
does not require any preliminary learning phase,
does not require the object of interest (of known 3D model) to be kept in the field of view of the camera throughout its trajectory, or, to put it another way, does not require the object to be seen in each image,
is robust to occlusions and to great changes of camera/object distance,
makes it possible to naturally refine an approximate initial pose,
enhances the accuracy of the 3D reconstruction of the environment,
works on textured or untextured objects,
guarantees a high degree of stability between two successive poses (no trembling which is often damaging for augmented reality applications for example),
makes it possible to reconstruct the environment and the object simultaneously which avoids the effects of tremors and inaccuracies.

Finally, a very accurate, robust and stable location system is obtained.

According to one feature of the invention, the optimization step is performed with a robust estimator exhibiting a rejection threshold, by adaptively controlling the influence of each type of terms as a function of this rejection threshold. Preferably, each type of terms of the reprojection error being associated with a rejection threshold linked to said rejection threshold of the robust estimator, the two rejection thresholds ($c_1$, $c_2$) are equal to the rejection threshold of the estimator estimated on residues based on the 3D model. This makes it possible to favor the constraints brought by the model while conserving the multi-image constraints brought by the primitives of the environment.

The calculation of the initial pose can be performed semi-automatically, with a target, also called marker, of known size and positioned relative to one of the planes of the reference frame of the object, a target being a set of 3D primitives located between them and identifiable in the image, this making it possible to fix three degrees of freedom, and the initial reconstruction is obtained by back-projection of the 2D primitives onto the model.

According to one feature of the invention, the step of calculating the pose of the camera for each new image is performed on the basis of the constraints of the 3D model of the primitives of the object of interest and of the primitives of the environment other than the object.

The optimization step can be followed by a triangulation step in which the primitives are not constrained by the 3D model.

The optimization and/or reconstruction steps are advantageously performed only for key images chosen when the number of primitives paired between the current image and the last key image is lower than a minimum value.

The optimization step is advantageously performed with a local bundle adjustment, which makes it possible to obtain a real time method.

The primitives constrained by the 3D model are chosen by means of whether the object of interest is textured and/or untextured.

BRIEF DESCRIPTION OF THE DRAWINGS

Other features and advantages of the invention will become apparent on reading the following detailed description, given as a nonlimiting example and with reference to the appended drawings in which.

DETAILED DESCRIPTION

The invention relies on a method of SfM type modified to incorporate geometric constraints linked to the knowledge of the model of an object in the scene. The scene, also called environment, is static, and the object does not change location in the scene, although it may itself be modified during the input of the sequence of images (video) by the camera, elements of the object of interest possibly being moved or removed during the video.

The following description is given in the context of locating of the camera (estimation of its trajectory) and of modeling (or reconstruction) of the 3D environment in which it is moving.

Hereinafter, for the environment, a distinction will be drawn between the known part thereof, namely the model of the object, and the unknown part of the environment which is the environment outside the model.

Figure 1:
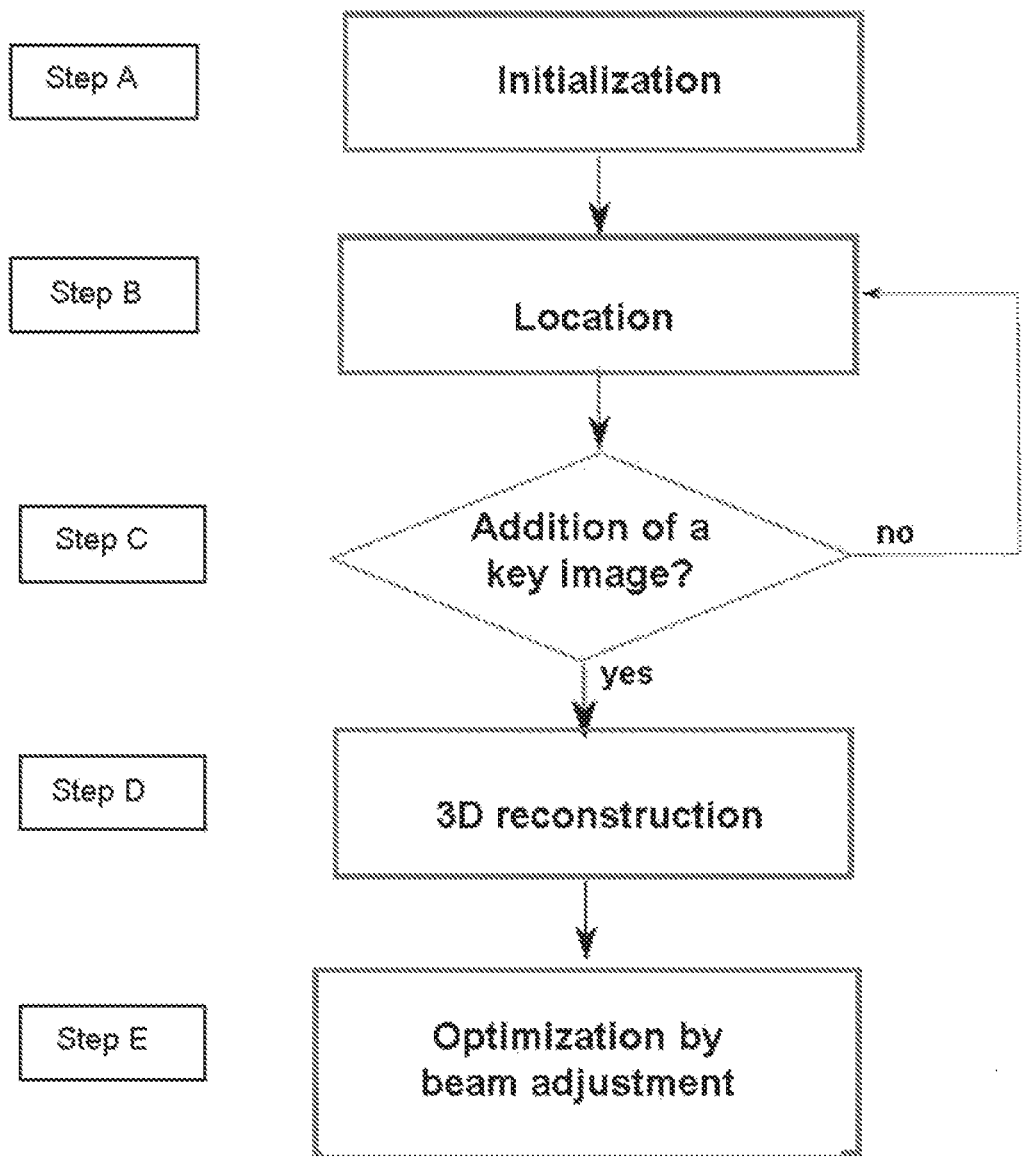
FIG. 1 schematically represents the main steps of a method for locating a camera and for 3D reconstruction according to the prior art, FIG. 2 schematically represents the main steps of a method for locating a camera and the 3D reconstruction according to the invention.
Figure 2:
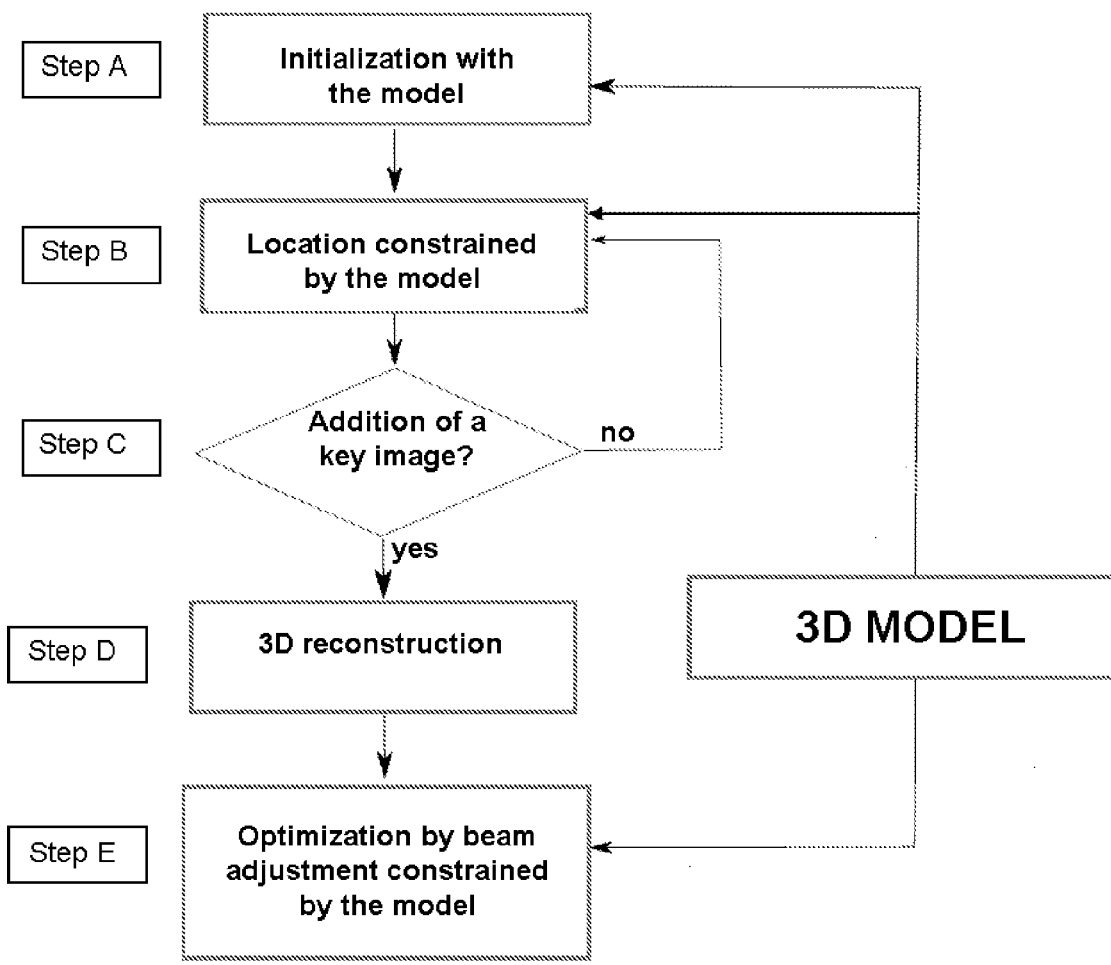

The invention is based on a SfM method. This SfM method in its original version is identical to that proposed by E. Mouragnon, M. Lhuillier, M. Dhome, F. Dekeyser and P. Sayd, in "Real time localization and 3d reconstruction", in CVPR, 2006, used for points of interest but which can be applied to different types of primitives. In its original version, this conventional SfM method described in relation to FIG. 1, comprises the following four steps: initialization (step A), location (step B), reconstruction (step D), optimization (step E). It should be noted straight away that the last three can be executed either sequentially or in parallel.

The initialization consists in performing a first 3D reconstruction of the observed scene and in calculating the first pose (position and rotation) of the camera.

The location (also called 3D tracking) consists in calculating the pose of the camera from the correlation of the 3D primitives of the scenes that have already been reconstructed with the 2D primitives of the current image.

The 3D reconstruction consists in matching the primitives of the preceding images (2D tracking) with the detected in the current image in order to thus allow for the 3D reconstruction of the primitives, notably the new ones, by 3D triangulation.

The optimization makes it possible to refine the 3D reconstruction of the scene and the estimated trajectory of the camera. The optimization is based on minimizing a non-linear cost function, in this case the reprojection error, which thus makes it possible to best match the reconstructive primitives reprojected in the images with those observed in the images. A number of methods can be used, one of which that can be cited being bundle adjustment. Moreover, it is also possible to use a method based on the epipolar geometry by minimizing a 2D error in the image, and according to which the trajectory is first optimized, the reconstruction of the scene being optimized in a second time.

For real time performance purposes, the 3D reconstruction and optimization steps are not performed on all the images but only for certain images called "key image" (step C). They are chosen, in a conventional manner known to those skilled in the art, by obtaining a trade-off between the number of primitives matched in the images and a relative displacement between the poses of the cameras to favor the 3D reconstruction performed by triangulation. This amounts to choosing a key image when the number of matched primitives between the current image and the last key image is lower than a minimum value.

Generally, this optimization phase is performed with a bundle adjustment which makes it possible to simultaneously optimize the trajectory and the reconstruction. The optimization by bundle adjustment minimizes the sum of the reprojection errors, namely the sum of the distances of the projected 3D primitives and of the detected 2D primitives.

The optimization phase based on a bundle adjustment will be detailed, using the following notations.

The vectors are expressed as uniform coordinates. For example $q \equiv (x, y, w)^T$ where T is the transposed and $\equiv$ the equality to within a scale factor. The reconstruction of the scene that is to be refined consists of N 3D points $\{Q_i\}_{i=1}^{N}$ and of m poses of the camera $\{C_k\}_{k=1}^{m}$. The observation of the 3D point $Q_i$ in the camera for the pose $C_k$ is denoted $q_{i,k}$ and the set of observing camera indices $Q_i$ is denoted $A_i$. The projection matrix $P_k$ associated with the pose of the camera $C_k$ is given by $P_k = KR_k^T(I_3|-t_k)$, where K is the matrix of the intrinsic parameters and $(R_k; t_k)$ the parameters of the pose of the camera at the instant k. The conventional bundle adjustment makes it possible to simultaneously refine the 3D points describing the observed scene and the poses of the camera. It minimizes the sum of the distances squared between the projections of the 3D points in the images and their observations. This geometric distance is called the reprojection error $\epsilon$. The parameters to be optimized are the three coordinates of the N 3D points and the six extrinsic parameters of the m poses of the camera. The total number of parameters is then 3N+6 m. The cost function is given by:

$$\varepsilon(\{R_k, t_k\}_{k=1}^{m} \cdot \{Q_i\}_{i=1}^{N}) = \sum_{i=1}^{N} \sum_{j \in A_i} d^2(q_{i,j}, P_j Q_i),$$

where $d^2(q,q') = \|q-q'\|^2$ is the distance squared between two points in the image.

According to the invention, the optimization by bundle adjustment, the initialization and possibly the location are subject to the constraints of the 3D model of the object of interest.

An optimization can advantageously be performed by local bundle adjustment which consists in optimizing the poses and the observed 3D points of the N last key images by using the residues of the observations of these points in the M last key images (N<=M and M being able to be as many as all the observations). The interest is in obtaining a real time method, with a reduction of the memory imprint relative to a global bundle adjustment. The method has been implemented with N=3.

The primitives used for each of the four phases can be points of interest, straight line segments, curves, planes, or a combination of several types of primitives (for example, points+segments), etc.

These phases will be detailed below.

As indicated, these constraints of the 3D model can be applied to the initialization (step A'), whether for the calculation of the initial pose or the initial reconstruction.

The initial pose calculation makes it possible to calculate the position and the orientation of the camera relative to a fixed reference frame on the object. A number of methods can be used for this step. Bleser et al., in "Online camera pose estimation in partially known and dynamic scenes", in ISMAR, 2006, proposes a semi-automatic method which consists in having the user realign the 3D model on the object in the image, and do so by moving the camera. The user must then realign the 6 degrees of freedom, until the pose is detected (automatically) as being sufficiently close to the reality to allow for a refinement based on the edges of the object in the image. A semi-automatic solution, relatively similar to that of Bleser et al., but much more user friendly, is proposed. It consists in placing a target of known size (of unknown position) on one of the planes of the reference frame of the object. 3 degrees of freedom (2 rotations and 1 translation) estimated by the target are thus fixed. The user must then realign the last 3 degrees of freedom. A refinement based on the edges of the object in the image is then performed. A set of 3D primitives located between them and identifiable in the image is called target. Note that this location and 3D reconstruction method requires only an approximate initial pose (with a tolerance up to 10% between the camera/object distance). This possibly approximate initial pose does not compromise the robustness of the method.

A first 3D reconstruction of the primitives is performed by back-projection of the 2D points detected in the initial image, onto the 3D model. A set of 3D points belonging to the model is then obtained, with a rough accuracy. The back-projection consists in performing, for each 2D point, a ray shot (ray tracing passing through the optical center of the camera and the 2D point) and in calculating the intersection between this ray and the surface of the 3D object.

For the 3D location phase (step B') which can be subject to the constraints of the model, but not necessarily, the pose of the camera is calculated on each new image by using the 3D/2D primitives matched. The method used (not subject to the constraints of the model) is of the same type as that described by E. Mouragnon, M. Lhuillier, M. Dhome, F. Dekeyser and P. Sayd, in "Real time localization and 3d reconstruction", in CVPR, 2006, used for points of interest but which can be applied to different types of primitives.

The 3D reconstruction phase is performed in a conventional manner by simple triangulation (step D).

The optimization phase (step E') is subject to the constraints of the model. This step begins with a back-projection of the 2D primitives of the current image in the 3D space. The primitives belonging to the object (their optical ray cutting the surface of the object) are thus distinguished from the 3D primitives belonging to the environment of the object.

As seen previously, the optimization with a conventional bundle adjustment consists in minimizing the sum of the reprojection errors, namely the sum of the distances squared between the projected 3D primitives and the detected 2D primitives. According to the invention, the cost function that is to be minimized is also the sum of these reprojection errors (residues), but the cost function is made up of two types of terms:
  one type of terms linked to the residues of the primitives constrained by the model,
  one type of terms linked to the residues of the primitives of the environment outside the model.

There now follows a more detailed description of how to make use of the additional constraints supplied by the 3D model of the object. The constraints of the model are formulated differently according to the primitives taken into account. Their formulation is now detailed for the following primitives: points of interest and straight line segments.

Two nonlinear cost functions are presented, combining the multi-view (that is to say multi-image) relationships and the constraints of belonging to the 3D model. The first, point based, can be applied to the textured objects whose primitives are generally points of interest. The second, edge-based, is applied to objects that are very little textured. They have in common the fact that they minimize a residual errors $\epsilon$ expressed in pixels. They can be used together in a bundle adjustment for the objects exhibiting texture and edges.

This cost functions $\epsilon$ is initially considered for points. We assume that the model is a set of triangles describing the faces of the object (set of planes $\pi$). The main idea is that a 3D point $Q_i$ belonging to a plane $\pi_i$ has only two degrees of freedom.

For an optimization of the location of the camera and of the 3D structure of the scene, the cost function obtained is:

$$\varepsilon(\{R_j, t_j\}_{j=1}^m, \{Q_i\}_{i \in u}, \{Q_i^{\pi_i}\}_{i \in M}) =$$

$$\underbrace{\sum_{i \in u} \sum_{j \in A_i} \rho(d^2(q_{i,j}, P_j Q_i), c_1)}_{\text{Unknown part of the environment (E)}} + \underbrace{\sum_{i \in M} \sum_{j \in A_i} \rho(d^2(q_{i,j}, P_j M^{\pi_i} Q_i^{\pi_i}), c_2)}_{\text{Known part of the environment (M)}}$$

bearing in mind that $M^{\pi_i}$ is the transfer matrix between the reference frame of the plane $\pi_i$ and the reference frame of the world such that $Q_i = M^{\pi_i} Q_i^{\pi_i}$ where $Q_i^{\pi_i} = (X^{\pi_i}, Y^{\pi_i}, 0, 1)^T$ and $(X^{\pi_i}, Y^{\pi_i})$ are the coordinates of $Q_i$ on the reference frame of the plane $\pi_i$,
that $c_1$, $c_2$ are the rejection thresholds of the robust estimator, and that $\rho$ is a robust estimator function such that $\rho(r,c) = r^2/(r^2 + c^2)$, r being the residual error of a cost function and c the rejection threshold of the estimator.

In the case where the object of interest is untextured, model constraints based on straight line segments are used. The geometric model of the object is, in this case, edges of the model. This model is then sampled automatically in E segments (of midpoints $\{M_i\}_{i=1}^E$ and directions $\{D_i\}_{i=1}^E$) which are projected into the image. A maximum gradient in the normal direction $n_{i,k}$ of the projected segment is then sought in said image. $m_{i,k}$ is used to denote the maximum gradient associated with the projection of the midpoint $M_i$ in the camera $C_k$ and $S_i$ is used to denote the set of the observing camera indices $M_i$. The distance (in pixels) between the midpoint of the segment reprojected into the image and the associated maximum gradient is then used to constrain the trajectory of the camera and the 3D reconstruction of the primitives of the unknown environment, and the resulting cost function is:

$$\varepsilon(\{R_j, t_j\}_{j=1}^m, \{Q_i\}_{i=1}^N) =$$

$$\underbrace{\sum_{i=1}^N \sum_{j \in \mathcal{A}_i} \rho(d^2(q_{i,j}, P_j Q_i), c_1)}_{\text{Unknown part of the environment (E)}} + \underbrace{\sum_{i=1}^E \sum_{j \in \ell_i} \rho(|n_{i,j} \cdot (m_{i,j} - P_j M_i)|, c_2)}_{\text{Known part of the environment (M)}}$$

The proposed solution is robust to the imperfections of the initial 3D registration and to the geometric imperfections of the model (model that does not perfectly conform to reality). In practice, an approximate initial 3D registration for geometric imperfections of the models and the drift induced by the algorithms of SfM type can introduce bad primitive-model associations which can prevent the convergence of the optimization process. To manage these aberrant associations, a robust estimation is performed with the M-estimator. The German-McClure estimator, which has the particular feature of being normalized, is, for example, used.

One of the great difficulties in minimizing a bi-objective problem is how to control the influence of each term. This is generally done by using a weighting parameter which is fixed by trial and error or by using cross-validation as described by Michela Farenzena, Adrien Bartoli and Youcef Mezouar in "Efficient camera smoothing in sequential structure-from motion using approximate cross-validation" in ECCV, 2008. A simpler alternative is proposed: the influence of each type of term(s) is directly controlled by using the rejection threshold of the robust estimator calculated by the median of the absolute deviations of the residues which is usually denoted MAD (Median of Absolute Deviation). The benefit of this so-called adaptive weighting method, validated by trial and error, is that it allows for an automatic weighting in real time. Three possibilities are, for example, envisaged:

$c1 = c_{environment}$ and $c2 = c_{model}$,
$c1 = c2 = c_{all}$,
$c1 = c2 = c_{model}$, $c_{model}$ being the rejection threshold estimated on the model-based residues, $c_{environment}$ being the rejection threshold estimated on the residues of the unknown parts of the environment, $c_{all}$ being the rejection threshold estimated on all the residues.

By positing $c1 = c2 = c_{all}$, it is arbitrarily considered that the two types of residues have the same order of magnitude; whereas, in the other two cases, the fact that the residues associated with the model in practice have higher values is taken into account. In the first case, the known parts (model) and unknown parts of the environment are considered in an identical manner; in the third case, the known parts (model) are favored during the optimization while guaranteeing that the constraints associated with the unknown part of the environment are still verified. This third case is preferred.

Compared to the conventional optimization, the optimization with model constraints therefore entails additional steps. In practice, to produce the model constraints, the primitives must be associated with the model (2D or 3D association depending on the chosen constraint). Two types of associations are possible generating different constraints:

3D-3D association phase: the reconstructed 3D primitives (3D points, 3D segments) are associated with the planes or with the edges of the model. For a given primitive, the model constraint is applied to the primitive concerned and to the trajectory of the camera in the optimization phase. The constraint can be reflected in the number of degrees of freedom assigned to the 3D primitive according to the part of the model with which it has been associated (examples: a 3D point that has been reconstructed and not associated with the model has 3 degrees of freedom whereas a 3D point that has been reconstructed and associated with a plane of the model has 2 degrees of freedom because it can move only in the plane in which it has been associated. A 3D segment that has been reconstructed and not associated with the model has at least 4 degrees of freedom whereas a 3D segment that has been reconstructed and associated with a plane of the model has 2 degrees of freedom; a 3D segment that has been reconstructed and associated with an edge of the model has 1 degree of freedom).

3D-2D association phase: the 3D primitives extracted from the model (3D points, 3D segments) are reprojected into the images and associated with 2D primitives (2D points, 2D segments, 2D edges). The constraint is then reflected in the fact that a 3D point or segment extracted from the model has zero degrees of freedom. It is only used to constrain the trajectory of the camera in the optimization phase.

The optimization step (E') thus comprises the following sub-steps:

1. Association of the primitives with the environment or with the model:

Examples of primitives that can be cited include:
 a. Case of reconstructed points: projections of each 3D point $Q_i$ ( ) on its associated plane $\pi_i$, the plane associated with the 3D point being that cut by the maximum of optical rays created by the 2D observations associated with this same 3D point.
 b. Case of reconstructed segments: projection of each 3D segment on its associated plane $\pi_i$, the plane associated with the 3D segment being that cut by the maximum of optical rays created by the 2D observations associated with this same 3D segment.
 c. Case of 3D points 3D extracted from the model: projection of the 3D points visible in each of the key images included in the 2D optimization and 2D association with the points of interest detected in these images.
 d. Case of 3D segments extracted from the model: projection of the 3D segments visible in each of the key images included in the 2D optimization and 2D association with the edges in these images.

2. Calculation of the rejection thresholds of the estimator.
3. Optimization of the error $\epsilon$ of the estimator.

The bundle adjustment that is thus proposed therefore relies on:
 a bi-objective function comprising a type of term(s) constrained by the 3D model and a type of term(s) for the multi-view constraints of the primitives of the unknown environment,
 an adaptative adjustment of the influence between these two types of term(s) by the rejection thresholds $c_1$ and $c_2$.

This method makes it possible to adapt to the imperfections of the model, to the local variations of the object or even to occlusions of the object.

For example, if the object viewed is locally modified (because, for example, of the removal of a part of the object), the algorithm will automatically adapt to this change. More precisely, by virtue of the adaptive control of the rejection thresholds (determined automatically), primitives initially constrained by the model will be either rejected or identified as primitives belonging to the unknown environment (they will therefore be involved in the first term of the cost function). The same phenomenon will appear if the object is concealed partially or even entirely.

Thus, the method according to the invention is naturally robust to model imperfections: it works even if the geometric model of the object of interest is not exactly the same as that of the object concerned. The method is similarly robust if the object is modified slightly during the sequence. This is due to the fact that the primitives are not forced to belong to the model during the reconstruction step D which makes it possible to reappraise the primitive-model association on each optimization step E'.

On the same principle, it is also possible to optimize only the trajectory of the camera and to optimize the geometry of the scene in an induced manner. This is obtained by eliminating the position parameters of the primitives of the optimization. The benefit is in reducing the memory imprint and also increasing the convergence basin of the method (fewer parameters to be optimized). For this, a bundle adjustment will no longer be used, but other cost functions can be used, based on the epipolar geometry (example: fundamental matrix for the primitives of the environment, homography for the primitives associated with one of the different planes that make up the model). It will be noted in this case that, to retrieve the geometry of the scene, it is sufficient to triangulate the primitives after having refined the trajectory of the camera.

The epipolar geometry defines the geometrical relationships between two images of the same scene picked up by a camera from two distinct positions. It links the two observations ($q_{i,1}$, $q_{i,2}$) of a 3D point $Q_i$ by the fundamental matrix as follows:

$q_{i,2}^T F q_{i,1} = 0$ where F is a matrix of size 3×3 of rank 2, $F_{j,k}$ denotes the fundamental matrix between the pair of images (j,k).

This relationship means that any point $q_{i,2}$ of the second image corresponding to the point $q_{i,1}$ of the first image must be on the epipolar line l such that $l = F q_{i,1}$.

$d_l(q,l)$ is used to designate the point-to-line distance between a point q and a line l by:

$$d_l^2(q, l) = \frac{(q^T l)^2}{\|l\|^2 \omega^2}$$

$\omega$ being the last element of the vector q expressed as uniform coordinates.

In a geometry with two viewing angles, two images of the same plane $\pi$ are linked by a homography H such that: $q_{i,1} \sim H\, q_{i,2}$.

This is the equivalent of the preceding relationship of the epipolar geometry for the plane. The homography H induced by the plane $\pi$ is:

$$H = K\left(R - \frac{t n^T}{d}\right) K^{-1}$$

where n is the normal to the plane and d the distance between C1 and the plane.

$H_{j,k}^{\pi_i}$ is used to denote the homography induced by the observation of the plane $\pi_i$ from positions j and k of the camera.

When only the location of the camera is to be optimized, the cost function obtained is then:

$$\varepsilon(\{(R,t)p \to p+1\}_{p=1}^{m-1}) = \underbrace{\sum_{i \in U} \sum_{j \in A_i} \sum_{\substack{k \in A_i \\ k \neq j}} \rho(d_l^2(q_{i,j}, F_{j,k} q_{i,k}), c_1)}_{\text{Unknown part of the environment (E)}} +$$

$$\underbrace{\sum_{i \in M} \sum_{j \in A_i} \sum_{\substack{k \in A_i \\ k \neq j}} \rho(d^2(q_{i,j}, H_{j,k}^{\pi_i} q_{i,k}), c_2)}_{\text{Known part of the environment (M)}}$$

Each of the back-projection errors presented comprises only two terms. More generally, it comprises only two types of terms, one constrained by the 3D model and the other for the multi-view constraints of the primitives of the unknown environment, each type of terms itself being able to comprise a number of terms. It is in fact possible to separate the unknown environment into two parts, with one term for a textured part and another for the untextured part; the same applies for the known part of the environment (model) which would also comprise two terms according to the textured or untextured parts of the model.

A number of applications require 3D object tracking:

Augmented reality which consists in adding, to a real scene, overlaid virtual information (based on the video stream from a camera or on the direct view of the user if the latter uses semi-transparent glasses). The concept of augmented reality also aims to increase our perception of the real world, by adding virtual elements to it which are not a priori visible. Its applications are many and affect an increasing number of fields: video games, cinema and television (virtual studios, sporting retransmissions, etc.), industry (conception, design, maintenance, assembly, robotics, etc.), medical, etc.

The field of robotics: in the context of the guiding or servo controlling of robots by vision (autonomous navigation) or of robotized arms for the manipulation of specific objects.

Automobile industry: in the context of navigation assistance for vehicles in an urban environment.

For all these applications, computer vision then offers an inexpensive, practical and non-invasive solution.

The camera is calibrated and its intrinsic parameters (focal point, central point of the image) are known.

The images come from a real time stream or from a prerecorded video.

The invention claimed is:

1. A method for locating a camera and for a 3D reconstruction of a static environment in which the camera is moving and of which the camera forms images, the static environment comprising an object of interest of which a 3D model is known and in which the static environment outside of the object is unknown, the method comprising the following steps:

calculating an initial pose of the camera in the static environment and of an initial reconstruction;

calculating a pose of the camera for each new image by matching 3D primitives of the static environment with 2D primitives of the new image and reconstructing 3D primitives of the static environment by triangulation; and simultaneously optimizing the pose of the camera for each new image and of the 3D primitives by minimizing a reprojection error over a plurality of images, wherein the 3D model is a geometric description of the object of interest, the reprojection error comprises only two types of terms, a first type of the two types of terms linked to first primitives constrained by the 3D model and a second type of the two types of terms linked to second primitives of the static environment other than the object, and simultaneously optimizing comprises associating primitives with the static environment or with the 3D model, and wherein simultaneously optimizing is performed with a robust estimator exhibiting a rejection threshold, by adaptively controlling an influence of the two types of terms as a function of the rejection threshold.

2. The method for locating a camera and for the 3D reconstruction of the environment as claimed in claim 1, wherein, each type of the terms of the reprojection error being associated with a rejection threshold of the robust estimator, the robust estimator having two rejection thresholds (c1, c2) are equal to the rejection threshold of the estimator estimated on residues based on the 3D model.

3. The method for locating a camera and for the 3D reconstruction of the environment as claimed in claim 1, wherein the calculation of the initial pose is performed semi-automatically, with a target of known size and positioned relative to a plane of a reference frame of the object, a target being a set of 3D primitives located between the camera and the object and identifiable in the image, and in that the initial reconstruction is obtained by back-projection of the 2D primitives onto the model.

4. The method for locating a camera and for the 3D reconstruction of the environment as claimed in claim 1, wherein calculating the pose of the camera for each new image is performed on a basis of the primitives constrained by the 3D model and of the primitives of the environment other than the object.

5. The method for locating a camera and for the 3D reconstruction of the environment as claimed in claim 1, wherein simultaneously optimizing is followed by triangulation wherein the first primitives are not constrained by the 3D model.

6. The method for locating a camera and for the 3D reconstruction of the environment as claimed in claim 1, wherein reconstructing the 3D primitives and simultaneously optimizing the pose of the camera are performed only for key images chosen when a number of primitives matched between a current image and a last key image is lower than a minimum value.

7. The method for locating a camera and for reconstructing the 3D primitives of the static environment as claimed in claim 1, wherein simultaneously optimizing is performed with a local bundle adjustment.

8. The method for locating a camera and for reconstructing the 3D primitives of the static environment as claimed in claim 1, wherein the images originate from a real time video stream and from a prerecorded video.

9. The method for locating a camera and for reconstructing the 3D primitives of the static environment as claimed in claim 1, wherein the object of interest is not visible in certain images or is modified from one image to another.

10. The method for locating a camera and for reconstructing the 3D primitives of the static environment as claimed in claim 1, wherein the primitives constrained by the 3D model are chosen as a function of whether the object is textured or untextured.

* * * * *